United States Patent
Kim et al.

(10) Patent No.: US 10,892,821 B2
(45) Date of Patent: Jan. 12, 2021

(54) METHOD FOR MAPPING CODE WORD AND LAYER IN NEXT GENERATION COMMUNICATION SYSTEM, AND DEVICE THEREFOR

(71) Applicant: LG ELECTRONICS INC., Seoul (KR)

(72) Inventors: Hyungtae Kim, Seoul (KR); Kijun Kim, Seoul (KR); Jiwon Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/495,823

(22) PCT Filed: Mar. 20, 2018

(86) PCT No.: PCT/KR2018/003207
§ 371 (c)(1),
(2) Date: Sep. 19, 2019

(87) PCT Pub. No.: WO2018/174510
PCT Pub. Date: Sep. 27, 2018

(65) Prior Publication Data
US 2020/0036438 A1    Jan. 30, 2020

Related U.S. Application Data

(60) Provisional application No. 62/474,071, filed on Mar. 20, 2017.

(51) Int. Cl.
*H04B 7/26* (2006.01)
*H04L 1/18* (2006.01)
(Continued)

(52) U.S. Cl.
CPC ......... *H04B 7/2637* (2013.01); *H04B 7/0413* (2013.01); *H04B 7/063* (2013.01);
(Continued)

(58) Field of Classification Search
None
See application file for complete search history.

(56) References Cited

U.S. PATENT DOCUMENTS 7,298,794 B2 * 11/2007 Calderbank ............ C07K 14/78
375/299
2009/0282310 A1    11/2009 Seok et al.
(Continued)

FOREIGN PATENT DOCUMENTS

EP    2883413    6/2015

OTHER PUBLICATIONS

PCT International Application No. PCT/KR2018/003207, Written Opinion of the International Searching Authority dated Jun. 18, 2018, 15 pages.
(Continued)

*Primary Examiner* — Jutai Kao
(74) *Attorney, Agent, or Firm* — Lee, Hong, Degerman, Kang & Waimey

(57) ABSTRACT

The present application discloses a method for a terminal to receive a downlink signal including at least one code word in a wireless communication system. Particularly, the method is characterized by: a step of receiving a first code word, through a first number of layers, and a second code word, through a second number of layers, which have been newly transmitted from a base station; a step of transmitting, to the base station, a negative acknowledgement for one of the first code word and the second code word; and receiving, from the base station, a code word which has been re-transmitted in response to the negative acknowledgement,
(Continued)

and a third code word which has been newly transmitted, wherein the number of layers for receiving the re-transmitted code word is equal to the number of layers involved in the new transmission thereof.

11 Claims, 9 Drawing Sheets

(51) Int. Cl.
  *H04L 5/00* (2006.01)
  *H04W 72/04* (2009.01)
  *H04W 72/06* (2009.01)
  *H04B 7/06* (2006.01)
  *H04B 7/0413* (2017.01)
  *H04W 88/06* (2009.01)

(52) U.S. Cl.
  CPC ......... *H04B 7/0669* (2013.01); *H04L 1/1887* (2013.01); *H04L 5/0055* (2013.01); *H04W 72/046* (2013.01); *H04W 72/048* (2013.01); *H04W 72/06* (2013.01); *H04W 88/06* (2013.01)

(56) References Cited

U.S. PATENT DOCUMENTS

| | | |
|---|---|---|
| 2010/0077274 A1 | 3/2010 | Kim et al. |
| 2011/0019764 A1* | 1/2011 | Chung ................. H04B 7/0413 |
| | | 375/295 |
| 2013/0064212 A1* | 3/2013 | Ogawa ................. H04B 7/0413 |
| | | 370/329 |
| 2015/0173057 A1 | 6/2015 | Chung et al. |
| 2016/0365993 A1 | 12/2016 | Chen et al. |
| 2017/0244519 A1* | 8/2017 | Yang ..................... H04L 1/1607 |

OTHER PUBLICATIONS

Catt, "On codeword-to-layer mapping", 3GPP TSG RAN WG1 Meeting #88, R1-1702069, Feb. 2017, 4 pages.
Intel, "On codeword to MIMO layer mapping for NR", 3GPP TSG RAN WG1 Meeting #88, R1-1702188, Feb. 2017, 3 pages.
European Patent Office Application Serial No. 18771459.7, Search Report dated Oct. 30, 2020, 9 pages.

* cited by examiner

FIG. 2
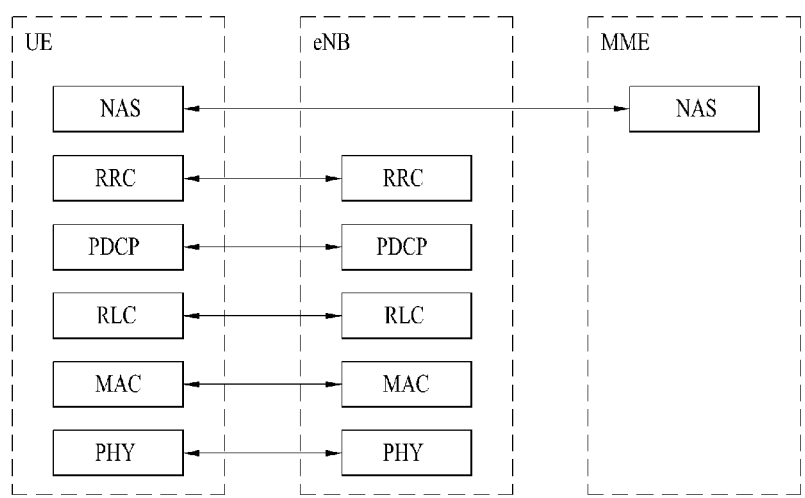
(A) CONTROL-PLANE PROTOCOL STACK
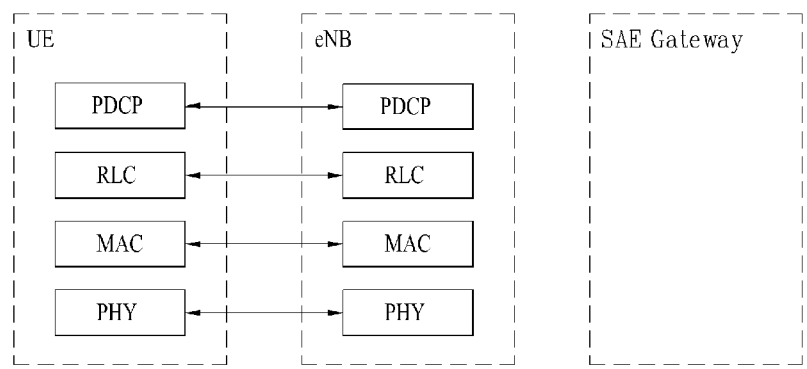
(B) USER-PLANE PROTOCOL STACK

METHOD FOR MAPPING CODE WORD AND LAYER IN NEXT GENERATION COMMUNICATION SYSTEM, AND DEVICE THEREFOR

CROSS-REFERENCE TO RELATED APPLICATIONS

This application is the National Stage filing under 35 U.S.C. 371 of International Application No. PCT/KR2018/003207, filed on Mar. 20, 2018, which claims the benefit of U.S. Provisional Application No. 62/474,071, filed on Mar. 20, 2017, the contents of which are all hereby incorporated by reference herein in their entirety.

TECHNICAL FIELD

The present disclosure relates to a wireless communication system, and more particularly, to a method for mapping between codewords and layers in a next-generation communication system and device therefor.

BACKGROUND ART

3GPP LTE (3rd generation partnership project long term evolution hereinafter abbreviated LTE) communication system is schematically explained as an example of a wireless communication system to which the present invention is applicable.

FIG. 1 is a schematic diagram of E-UMTS network structure as one example of a wireless communication system. E-UMTS (evolved universal mobile telecommunications system) is a system evolved from a conventional UMTS (universal mobile telecommunications system). Currently, basic standardization works for the E-UMTS are in progress by 3GPP. E-UMTS is called LTE system in general. Detailed contents for the technical specifications of UMTS and E-UMTS refers to release 7 and release 8 of "3rd generation partnership project; technical specification group radio access network", respectively.

Referring to FIG. 1, E-UMTS includes a user equipment (UE), an eNode B (eNB), and an access gateway (hereinafter abbreviated AG) connected to an external network in a manner of being situated at the end of a network (E-UTRAN). The eNode B may be able to simultaneously transmit multi data streams for a broadcast service, a multicast service and/or a unicast service.

One eNode B contains at least one cell. The cell provides a downlink transmission service or an uplink transmission service to a plurality of user equipments by being set to one of 1.25 MHz, 2.5 MHz, 5 MHz, 10 MHz, 15 MHz, and 20 MHz of bandwidths. Different cells can be configured to provide corresponding bandwidths, respectively. An eNode B controls data transmissions/receptions to/from a plurality of the user equipments. For a downlink (hereinafter abbreviated DL) data, the eNode B informs a corresponding user equipment of time/frequency region on which data is transmitted, coding, data size, HARQ (hybrid automatic repeat and request) related information and the like by transmitting DL scheduling information. And, for an uplink (hereinafter abbreviated UL) data, the eNode B informs a corresponding user equipment of time/frequency region usable by the corresponding user equipment, coding, data size, HARQ-related information and the like by transmitting UL scheduling information to the corresponding user equipment. Interfaces for user-traffic transmission or control traffic transmission may be used between eNode Bs. A core network (CN) consists of an AG (access gateway) and a network node for user registration of a user equipment and the like. The AG manages a mobility of the user equipment by a unit of TA (tracking area) consisting of a plurality of cells.

Wireless communication technologies have been developed up to LTE based on WCDMA. Yet, the ongoing demands and expectations of users and service providers are consistently increasing. Moreover, since different kinds of radio access technologies are continuously developed, a new technological evolution is required to have a future competitiveness. Cost reduction per bit, service availability increase, flexible frequency band use, simple structure/open interface and reasonable power consumption of user equipment and the like are required for the future competitiveness.

DISCLOSURE

Technical Problem

Based on the above discussion, the present disclosure provides a method for mapping between codewords and layers in a next-generation communication system and device therefor.

Technical Solution

In an aspect of the present disclosure, provided herein is a method of receiving a downlink signal including at least one codeword by a user equipment (UE) in a wireless communication system. The method may include: receiving a first codeword through a first number of layers and receiving a second codeword through a second number of layers, wherein the first and second codewords are initially transmitted from a base station; transmitting, to the base station, a negative acknowledgement for one of the first and second codewords; and receiving, from the base station, a codeword retransmitted in response to the negative acknowledgement and an initially transmitted third codeword. The sum of the first and second numbers may correspond to a minimum rank value for multi-codeword transmission. The retransmitted codeword and the initially transmitted third codeword may be received through a specific number of layers, wherein the specific number is less than the minimum rank value for the multi-codeword transmission. The number of layers through which the retransmitted codeword is received may be equal to that used for initial transmission.

In another aspect of the present disclosure, provided herein is a UE for receiving a downlink signal including at least one codeword in a wireless communication system. The UE may include: a wireless communication module; and a processor connected to the wireless communication module. The processor may be configured to: receive a first codeword through a first number of layers and receive a second codeword through a second number of layers, wherein the first and second codewords are initially transmitted from a base station; transmit, to the base station, a negative acknowledgement for one of the first and second codewords; and receive, from the base station, a codeword retransmitted in response to the negative acknowledgement and an initially transmitted third codeword. The sum of the first and second numbers may correspond to a minimum rank value for multi-codeword transmission. The retransmitted codeword and the initially transmitted third codeword may be received through a specific number of layers, wherein the specific number is less than the minimum rank value for the multi-codeword transmission. The number of layers through which the retransmitted codeword is received may be equal to that used for initial transmission.

Preferably, the minimum rank value for the multi-codeword transmission may be 5, and the specific number may be 4. More preferably, the first and second numbers may be 2 and 3, respectively. When the retransmitted codeword is the first codeword, the third codeword may be received through two layers. When the retransmitted codeword is the second codeword, the third codeword may be received through one layer.

Additionally, after transmitting the negative acknowledgement, the UE may feed back to the base station rank information corresponding to the specific number. In this case, the rank information corresponding to the specific number may include channel state information obtained by assuming single-codeword transmission and channel state information obtained by assuming the multi-codeword transmission.

Advantageous Effects

According to the present disclosure, codeword-to-layer mapping can be efficiently performed based on channel states in a next-generation communication system.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

FIG. 2 is a diagram illustrating structures of a control plane and a user plane of a radio interface protocol between a UE and an E-UTRAN based on the 3GPP radio access network specification.

BEST MODE

Figure 1:
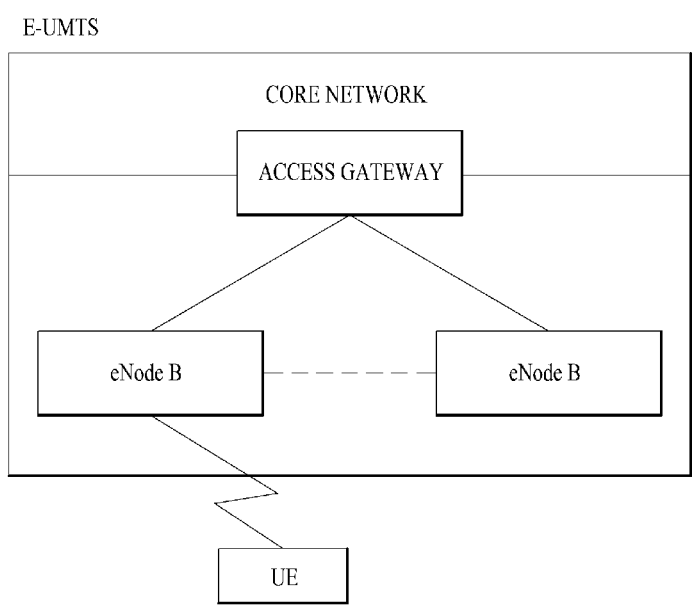
FIG. 1 is a diagram schematically illustrating a network structure of an E-UMTS as an exemplary radio communication system.

The configuration, operation and other features of the present invention will be understood by the embodiments of the present invention described with reference to the accompanying drawings. The following embodiments are examples of applying the technical features of the present invention to a 3rd Generation Partnership Project (3GPP) system.

Although the embodiments of the present invention will be described based on an LTE system and an LTE-advanced (LTE-A) system, the LTE system and the LTE-A system are purely exemplary and the embodiments of the present invention can be applied to any communication system corresponding to the aforementioned definition.

In the present disclosure, a base station (eNB) may be used as a broad meaning including a remote radio head (RRH), an eNB, a transmission point (TP), a reception point (RP), a relay, etc.

FIG. 2 is a diagram illustrating structures of a control plane and a user plane of a radio interface protocol between a UE and an E-UTRAN based on 3GPP radio access network specifications. The control plane refers to a path used for transmission of control messages, which is used by the UE and the network to manage a call. The user plane refers to a path in which data generated in an application layer, e.g. voice data or Internet packet data, is transmitted.

A physical layer of a first layer provides an information transfer service to an upper layer using a physical channel. The physical layer is connected to a media access control (MAC) layer of an upper layer via a transmission channel Data is transmitted between the MAC layer and the physical layer via the transmission channel. Data is also transmitted between a physical layer of a transmitter and a physical layer of a receiver via a physical channel. The physical channel uses time and frequency as radio resources. Specifically, the physical channel is modulated using an orthogonal frequency division multiple Access (OFDMA) scheme in DL and is modulated using a single-carrier frequency division multiple access (SC-FDMA) scheme in UL.

The MAC layer of a second layer provides a service to a radio link control (RLC) layer of an upper layer via a logical channel. The RLC layer of the second layer supports reliable data transmission. The function of the RLC layer may be implemented by a functional block within the MAC layer. A packet data convergence protocol (PDCP) layer of the second layer performs a header compression function to reduce unnecessary control information for efficient transmission of an Internet protocol (IP) packet such as an IPv4 or IPv6 packet in a radio interface having a relatively narrow bandwidth.

A radio resource control (RRC) layer located at the bottommost portion of a third layer is defined only in the control plane. The RRC layer controls logical channels, transmission channels, and physical channels in relation to configuration, re-configuration, and release of radio bearers. A radio bearer refers to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A non-access stratum (NAS) layer located at an upper level of the RRC layer performs functions such as session management and mobility management.

A cell constructing an eNB is configured by one of bandwidths among 1.25, 2.5, 5, 10, 15, and 20 MHz and provides DL or UL transmission service to a plurality of UEs. Cells different from each other can be configured to provide a different bandwidth. DL transmission channels for data transmission from the network to the UE include a broadcast channel (BCH) for transmitting system information, a paging channel (PCH) for transmitting paging messages, and a DL shared channel (SCH) for transmitting user traffic or control messages. Traffic or control messages of a DL multicast or broadcast service may be transmitted through the DL SCH or may be transmitted through an additional DL multicast channel (MCH). Meanwhile, UL transmission channels for data transmission from the UE to the network include a random access channel (RACH) for transmitting initial control messages and a UL SCH for transmitting user traffic or control messages. Logical channels, which are located at an upper level of the transmission channels and are mapped to the transmission channels, include a broadcast control channel (BCCH), a paging control channel (PCCH), a common control channel (CCCH), a multicast control channel (MCCH), and a multicast traffic channel (MTCH).

Figure 3:
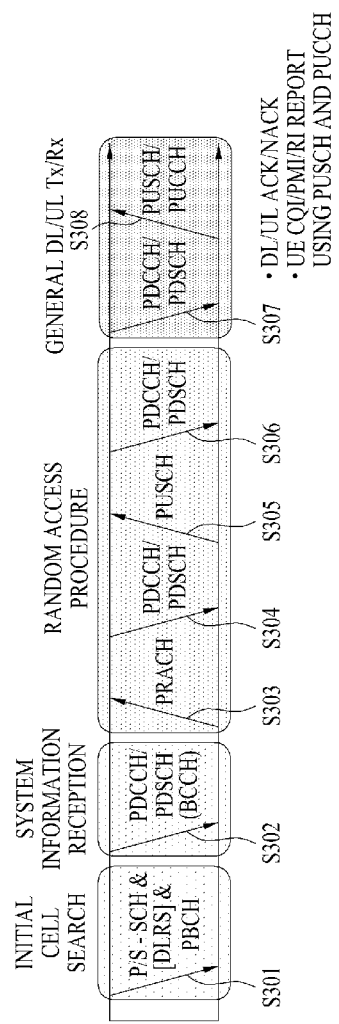
FIG. 3 is a diagram illustrating physical channels used in a 3GPP system and a general signal transmission method using the same.

FIG. 3 is a diagram illustrating physical channels used in a 3GPP system and a general signal transmission method using the same.

When power is turned on or the UE enters a new cell, the UE performs an initial cell search procedure such as acquisition of synchronization with an eNB (S301). To this end, the UE may adjust synchronization with the eNB by receiving a primary synchronization channel (P-SCH) and a secondary synchronization channel (S—SCH) from the eNB and acquire information such as a cell identity (ID). Thereafter, the UE may acquire broadcast information within the cell by receiving a physical broadcast channel from the eNB. In the initial cell search procedure, the UE may monitor a DL channel state by receiving a downlink reference signal (DL RS).

Upon completion of the initial cell search procedure, the UE may acquire more detailed system information by receiving a physical downlink control channel (PDCCH) and receiving a physical downlink shared channel (PDSCH) based on information carried on the PDCCH (S302).

Meanwhile, if the UE initially accesses the eNB or if radio resources for signal transmission to the eNB are not present, the UE may perform a random access procedure (S303 to S306) with the eNB. To this end, the UE may transmit a specific sequence through a physical random access channel (PRACH) as a preamble (S303 and S305) and receive a response message to the preamble through the PDCCH and the PDSCH associated with the PDCCH (S304 and S306). In the case of a contention-based random access procedure, the UE may additionally perform a contention resolution procedure.

After performing the above procedures, the UE may receive a PDCCH/PDSCH (S307) and transmit a physical uplink shared channel (PUSCH)/physical uplink control channel (PUCCH) (S308), as a general UL/DL signal transmission procedure. Especially, the UE receives downlink control information (DCI) through the PDCCH. The DCI includes control information such as resource allocation information for the UE and has different formats according to use purpose thereof.

Meanwhile, control information that the UE transmits to the eNB on UL or receives from the eNB on DL includes a DL/UL acknowledgment/negative acknowledgment (ACK/NACK) signal, a channel quality indicator (CQI), a precoding matrix index (PMI), a rank indicator (RI), and the like. In the 3GPP LTE system, the UE may transmit the control information such as CQI/PMI/RI through a PUSCH and/or a PUCCH.

Figure 4:
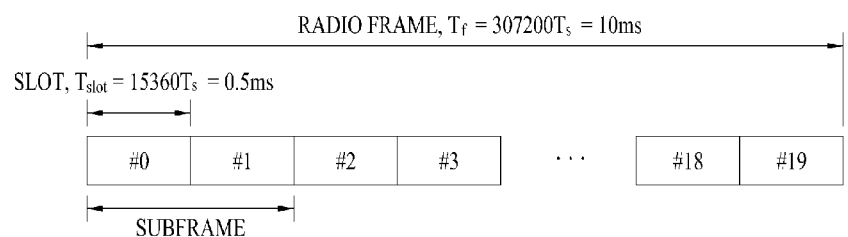
FIG. 4 is a diagram illustrating the structure of a radio frame used in an LTE system.

FIG. 4 is a diagram illustrating the structure of a radio frame used in an LTE system.

Referring to FIG. 4, the radio frame has a length of 10 ms ($327200 \times T_s$) and includes 10 equal-sized subframes. Each of the subframes has a length of 1 ms and includes two slots. Each slot has a length of 0.5 ms (15360 Ts). In this case, Ts denotes a sampling time represented by Ts=1415 kHz×2048) =$3.2552 \times 10-8$ (about 33 ns). Each slot includes a plurality of OFDM symbols in the time domain and includes a plurality of resource blocks (RBs) in the frequency domain. In the LTE system, one RB includes 12 subcarriers×7 (or 6) OFDM symbols. A transmission time interval (TTI), which is a unit time for data transmission, may be determined in units of one or more subframes. The above-described structure of the radio frame is purely exemplary and various modifications may be made in the number of subframes included in a radio frame, the number of slots included in a subframe, or the number of OFDM symbols included in a slot.

Figure 5:
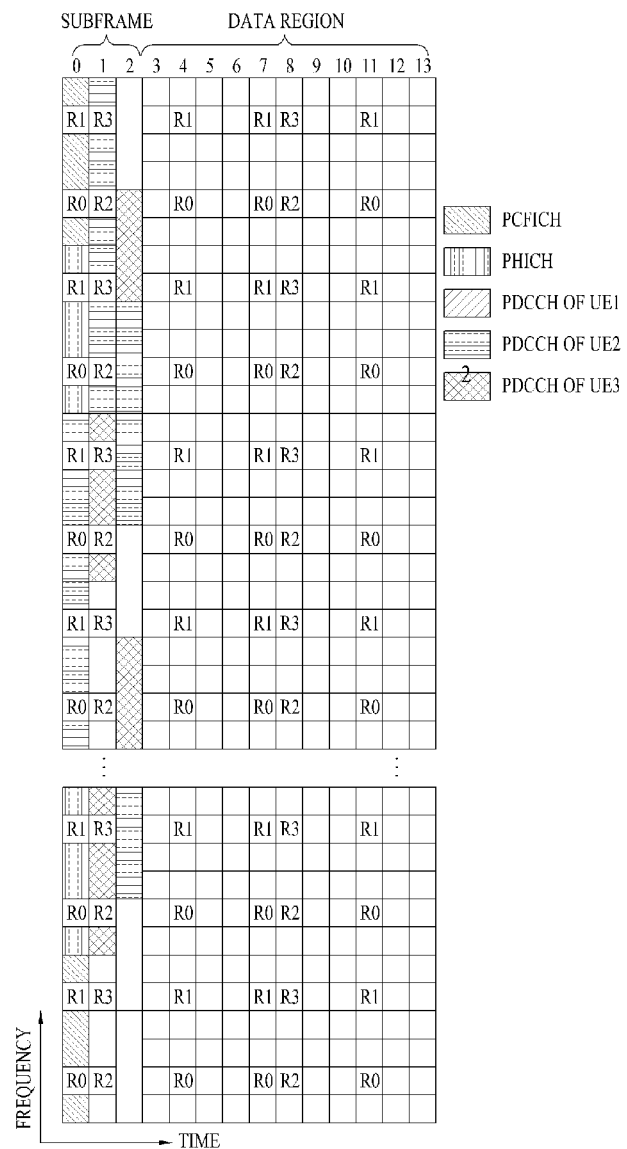
FIG. 5 is a diagram illustrating the structure of a DL radio frame used in an LTE system.

FIG. 5 is a diagram illustrating control channels included in a control region of one subframe in a DL radio frame.

Referring to FIG. 5, one subframe includes 14 OFDM symbols. The first to third ones of the 14 OFDM symbols may be used as a control region and the remaining 11 to 13 OFDM symbols may be used as a data region, according to subframe configuration. In FIG. 5, R0 to R3 represent reference signals (RSs) or pilot signals for antennas 0 to 3, respectively. The RSs are fixed to a predetermined pattern within the subframe irrespective of the control region and the data region. Control channels are allocated to resources unused for RSs in the control region. Traffic channels are allocated to resources unused for RSs in the data region. The control channels allocated to the control region include a physical control format indicator channel (PCFICH), a physical hybrid-ARQ indicator channel (PHICH), a physical downlink control channel (PDCCH), etc.

The PCFICH, physical control format indicator channel, informs a UE of the number of OFDM symbols used for the PDCCH in every subframe. The PCFICH is located in the first OFDM symbol and is configured with priority over the PHICH and the PDCCH. The PCFICH is composed of 4 resource element groups (REGs) and each of the REGs is distributed over the control region based on a cell ID. One REG includes 4 resource elements (REs). An RE indicates a minimum physical resource defined as one subcarrier by one OFDM symbol. The PCFICH value indicates values of 1 to 3 or values of 2 to 4 depending on bandwidth and is modulated using quadrature phase shift keying (QPSK).

The PHICH, physical hybrid-ARQ indicator channel, is used to carry a HARQ ACK/NACK signal for UL transmission. That is, the PHICH indicates a channel through which DL ACK/NACK information for UL HARQ is transmitted. The PHICH includes one REG and is cell-specifically scrambled. The ACK/NACK signal is indicated by 1 bit and is modulated using binary phase shift keying (BPSK). The modulated ACK/NACK signal is spread with a spreading factor (SF) of 2 or 4. A plurality of PHICHs mapped to the same resource constitutes a PHICH group. The number of PHICHs multiplexed to the PHICH group is determined depending on the number of spreading codes. The PHICH (group) is repeated three times to obtain diversity gain in the frequency domain and/or the time domain.

The PDCCH is allocated to the first n OFDM symbols of a subframe. In this case, n is an integer equal to or greater than 1, indicated by the PCFICH. The PDCCH is composed of one or more control channel elements (CCEs). The PDCCH informs each UE or UE group of information associated with resource allocation of transmission channels, that is, a paging channel (PCH) and a downlink shared channel (DL-SCH), UL scheduling grant, HARQ information, etc. The PCH and the DL-SCH are transmitted through a PDSCH. Therefore, the eNB and the UE transmit and receive data through the PDSCH except for particular control information or service data.

Information indicating to which UE or UEs PDSCH data is to be transmitted and information indicating how UEs should receive and decode the PDSCH data are transmitted on the PDCCH. For example, assuming that a cyclic redundancy check (CRC) of a specific PDCCH is masked by a radio network temporary identity (RNTI) 'A' and information about data transmitted using a radio resource 'B' (e.g. frequency location) and using DCI format 'C', i.e. transport format information (e.g. a transport block size, a modulation scheme, coding information, etc.), is transmitted in a specific subframe, a UE located in a cell monitors the PDCCH, i.e. blind-decodes the PDCCH, using RNTI information thereof in a search space. If one or more UEs having RNTI 'A' are present, the UEs receive the PDCCH and receive a PDSCH indicated by 'B' and 'C' based on the received information of the PDCCH.

Figure 6:
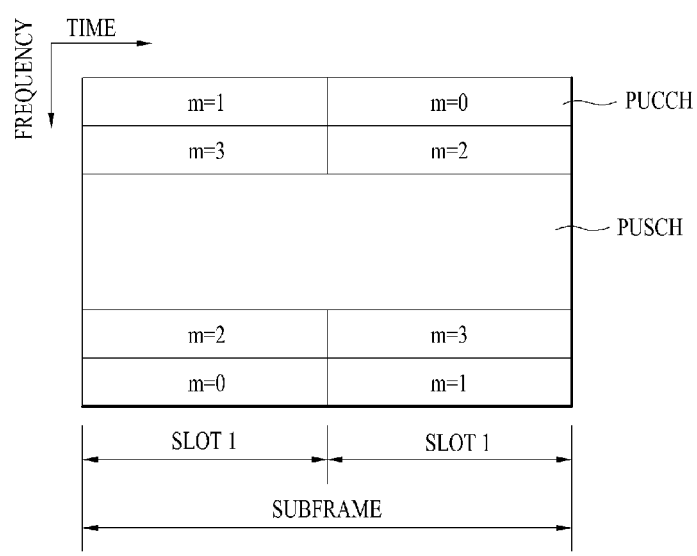
FIG. 6 is a diagram illustrating the structure of a UL subframe in an LTE system.

FIG. 6 is a diagram illustrating the structure of a UL subframe in an LTE system.

Referring to FIG. 6, an uplink subframe is divided into a region to which a PUCCH is allocated to transmit control information and a region to which a PUSCH is allocated to transmit user data. The PUSCH is allocated to the middle of the subframe, whereas the PUCCH is allocated to both ends of a data region in the frequency domain. The control information transmitted on the PUCCH includes an ACK/NACK, a channel quality indicator (CQI) representing a downlink channel state, an RI for Multiple Input and Multiple Output (MIMO), a scheduling request (SR) indicating a request for allocation of UL resources, etc. A PUCCH of a UE uses one RB occupying different frequencies in each slot of a subframe. That is, two RBs allocated to the PUCCH frequency-hop over the slot boundary. Particularly, PUCCHs for m=0, m=1, m=2, and m=3 are allocated to a subframe in FIG. 6.

Hereinbelow, a description of channel state information (CSI) reporting will be given. In the current LTE standard, a MIMO transmission scheme is categorized into open-loop MIMO operated without CSI and closed-loop MIMO operated based on CSI. Especially, according to the closed-loop MIMO system, each of the eNB and the UE may perform beamforming based on CSI in order to obtain multiplexing gain of MIMO antennas. To acquire CSI from the UE, the eNB allocates a PUCCH or a PUSCH to the UE and commands the UE to feed back CSI regarding a SL signal.

CSI is divided into three types of information: an RI, a PMI, and a CQI. First, RI is information on a channel rank as described above and indicates the number of streams that may be received by the UE via the same time-frequency resource. Since RI is determined by long-term fading of a channel, RI may be generally fed back at a cycle longer than that of PMI or CQI.

Second, PMI is a value reflecting a spatial characteristic of a channel and indicates a precoding matrix index of the eNB preferred by the UE based on a metric of signal-to-interference plus noise ratio (SINR). Lastly, CQI is information indicating the strength of a channel and indicates a reception SINR obtainable when the eNB uses PMI.

In a 3GPP LTE-A system, the eNB may configure a plurality of CSI processes for the UE and receive report for CSI regarding each CSI process. Herein the CSI process includes a CSI-RS resource for measuring quality of a signal received from the eNB and a CSI-interference measurement (CSI-IM) resource for measuring interference, i.e., an interference measurement resource (IMR).

In a millimeter wave (mmW) band, wavelength is shortened, and thus a plurality of antenna elements may be installed in the same area. Specifically, a total of 64 (=8×8) antenna elements may be installed in a 4-by-4 cm panel in a 30 GHz band with a wavelength of about 1 cm in a 2-dimensional array at intervals of 0.5λ, (wavelength). Therefore, in mmW, increasing coverage or throughput by increasing beamforming (BF) gain using multiple antenna elements has recently been taken into consideration.

If a transceiver unit (TXRU) is provided for each antenna element to enable adjustment of transmit power and phase, independent BF is possible for each frequency resource. However, installing TXRU in all of the about 100 antenna elements is less feasible in terms of cost. Therefore, a method of mapping multiple antenna elements to one TXRU and adjusting the direction of a beam using an analog phase shifter is under consideration. This analog BF method may make only one beam direction in the whole band, and thus may not perform frequency selective BF, which is disadvantageous.

Hybrid BF using B TXRUs less in number than Q antenna elements may be considered as an intermediate type of digital BF and analog BF. In this case, the number of beam directions in which beams may be transmitted at the same time is limited to B or less, which depends on a connection method of B TXRUs and Q antenna elements.

Figure 7:
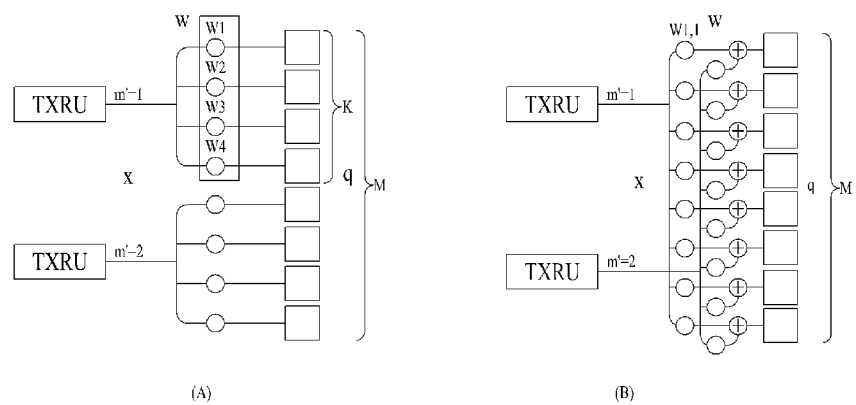
FIG. 7 illustrates exemplary connection schemes between TXRUs and antenna elements.

FIG. 7 illustrates exemplary connection schemes between TXRUs and antenna elements.

FIG. 7(a) illustrates connection between a TXRU and a sub-array. In this case, an antenna element is connected only to one TXRU. In contrast, FIG. 7(b) illustrates connection between a TXRU and all antenna elements. In this case, an antenna element is connected to all TXRUs. In FIG. 7, W represents a phase vector subjected to multiplication in an analog phase shifter. That is, a direction of analog BF is determined by W. Herein, CSI-RS antenna ports may be mapped to TXRUs in a one-to-one or one-to-many correspondence.

As more communication devices have demanded higher communication capacity, there has been necessity of enhanced radio broadband communication relative to legacy radio access technology (RAT). In addition, massive machine type communication (MTC) for providing various services anytime and anywhere by connecting a plurality of devices and objects to each other is also one main issue to be considered in next-generation communication. Further, a communication system to be designed in consideration of services/UEs sensitive to reliability and latency is under discussion. Thus, introduction of next-generation RAT has been discussed by taking into consideration such matters. In the present invention, the above technology is referred to as new RAT for convenience of description.

Figure 8:
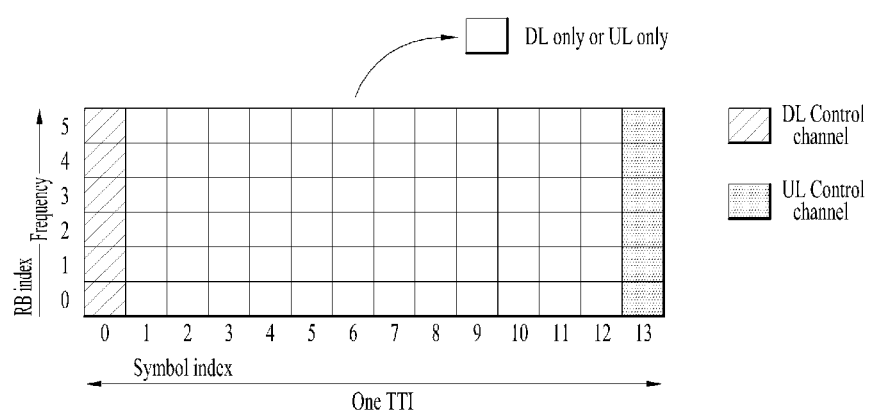
FIG. 8 illustrates the structure of an exemplary self-contained subframe.

To minimize data transmission latency in a time division duplex (TDD) system, the structure of a self-contained subframe as illustrated in FIG. 8 is considered in fifth-generation (5G) new RAT. FIG. 8 illustrates the structure of an exemplary self-contained subframe.

In FIG. 8, the hatched area represents a DL control region and the black area represents a UL control region. The area having no marks may be used for either DL data transmission or UL data transmission. In this structure, DL transmission and UL transmission may be sequentially performed in one subframe to send DL data and receive UL ACK/NACK therefor in a subframe. As a result, this structure may reduce time taken to retransmit data when a data transmission error occurs, thereby minimizing the latency of final data transmission.

In such a self-contained subframe structure, a time gap is required in order for the eNB and the UE to switch from a transmission mode to a reception mode or from the reception mode to the transmission mode. To this end, some OFDM symbols at the time of switching from DL to UL in the subframe structure may be set as a guard period (GP).

Examples of the self-contained subframe type that may be configured/set in the system operating based on new RAT may consider at least four subframe types as follows.

DL control period+DL data period+GP+UL control period

DL control period+DL data period

DL control period+GP+UL data period+UL control period

DL control period+GP+UL data period

In the current LTE and LTE-A systems, modulation and coding scheme (MCS) configuration and HARQ processing are performed on a codeword (CW) basis. When two or more layers are used, two CWs may be transmitted. Thus, in an environment in which each multi-layer has a different channel quality, two independent MCS configurations may be established using two CWs. In addition, two independent ACKs/NACKs may be processed, and retransmission may be performed based thereon. In this case, although there is a disadvantage in that DCI overhead increases due to two MCS fields and two HARQ fields, link adaptation can be performed in a flexible manner, thereby maximizing the system transmission rate. Consequently, in the case of multi-layer transmission, i.e., multi-rank transmission, if each layer has a different channel quality, multiple CWs need to be supported. On the contrary, if each layer has a similar channel quality, a single CW need to be supported to reduce DCI overhead.

Hereinafter, a description will be given of CW-to-layer mapping in a next-generation communication system and DCI configuration based thereon.

First Embodiment

In the first embodiment of the present disclosure, transmission environments are classified into a DL single cell environment, a DL coordinated multipoint (CoMP) joint transmission (JT) environment, and a UL environment. In addition, the degree of difference between channel qualities of individual layers are qualitatively analyzed in multi-rank transmission, and the number of CWs suitable for each environment is proposed.

In the UL environment, a UE, which corresponds to a transmitting end, may use a bi-directional transmission antenna. That is, although the bi-directional transmission antenna is a single panel antenna, it may include an antenna (s) facing the front of the panel, which radiates a transmission beam in the direction of the front panel, and an antenna(s) facing the back of the panel. Thus, the front and back antennas may have different channel qualities. That is, since signals transmitted on the front and back antennas are received by a base station after passing through different scatters, different fading channels and different channel qualities are formed.

Considering the size, cost, power, and the like of the UE, it is expected that two bi-directional transmission antennas will be used. When two-layer transmission is performed, each layer may have a different channel quality as described above. In UL transmission, one CW is used for one layer.

However, for two or more layers, it is necessary to manage the MCS configuration and HARQ processing per layer using two CWs.

Meanwhile, for DL transmission, a base station generally uses transmission antennas omni-directionally arranged in a panel. Thus, in multi-layer transmission, multiple layers may have similar channel qualities. In an X-Pol (polarization) antenna environment, one layer is created for each of H-Pol and V-Pol, and thus a total of two layers are created. Since each polarization antenna is located at the same position, it is expected that each antenna have a similar channel quality. Therefore, one CW is transmitted for one-layer transmission and two-layer transmission, but it is desirable to transmit two CWs for three or more layers. Alternatively, one CW may be transmitted for four layers or less, and two CWs may be used for five layers or more, thereby reducing link adaptation overhead and HARQ overhead.

When CoMP JT is used for DL transmission, TPs (or base stations) transmit data at different locations, each TP may have a different channel quality. For example, assuming that two TPs participate in JT using independent layers (independent layer JT), that is, each TP performs different layer transmission (for example, TP 1 performs transmission using layers 1 to x and TP 2 performs transmission using layers x+1 to N), two CWs need to be used. In other words, TP 1 and TP 2 transmit different CWs and perform link adaptation and HARQ per CW. In this case, it is desirable that when the independent layer JT is performed, two CWs are used for two or more layers.

In addition, when a TP uses an X-Pol antenna, it may be considered that one layer is created for each polarization antenna of each TP. In this case, if the independent layer JT is used, two CWs may be used for three or more layers and one CWs may be used for remaining layers since two layers corresponding to H-Pol and V-Pol of TP 1 have similar channel qualities and two layers corresponding to H-Pol and V-Pol of TP 2 have similar channel qualities. Alternatively, one CW may be transmitted four layers or less, and two CWs may be used for five layers or more, thereby reducing link adaptation overhead and HARQ overhead.

Hereinabove, it has been described that different CW-to-layer mapping and a different number of CWs are defined separately for CoMP and non-CoMP in the DL environment. However, considering implementation complexity and system management, it is desirable to use common CW-to-layer mapping and a common number of CWs regardless of whether the CoMP or non-CoMP is applied. In this case, for UL transmission, two CWs are used for two or more layers, and for DL transmission, two CWs are used for three or more layers, four or more layers, or five of more layers. In other words, the number of layers capable of using two CWs may be configured differently for UL and DL.

Additionally, the relationship between the number of CWs and the number of layers relates to initial transmission. When retransmission is performed after a NACK occurs, one CW may be transmitted regardless of the number of layers, i.e., through one, two, three, or four layers.

Second Embodiment

To minimize control channel overhead, DCI may be configured such that the overhead of MCS and HARQ related fields (e.g., RV, NDI) in the DCI decreases/increases depending on a layer turning point between one and two CWs (i.e., the number x of layers for which two CWs start to be used). To this end, a UE may report to a base station a MIMO capability, which indicates the maximum number of layers that the UE can support for SU-MIMO, or a UE capability, which indicates the number of transmission/reception antennas of the UE (or the number of TXRUs, antennas, or antenna ports) in UL and DL. Based on the report, the base station determines whether the maximum number of UE's UL/DL data transmission/reception layers reaches the layer turning point.

For example, assuming that the layer turning point is 4 and the MIMO capability is 2, the UE uses only one CW at all times. Assuming that the layer turning point is 4 and the number of transmission antennas is 2, the UE uses two CWs. Alternatively, for UL transmission, it may be determined by comparing the minimum value (among the number of transmission antennas and the UL MIMO capability) with the layer turning point. For DL transmission, it may be determined by comparing the minimum value (among the number of reception antennas and the DL MIMO capability) with the layer turning point. In this case, the number of transmission/reception antennas may be equivalent to the number of SRS ports or the number of CSI-RS ports configured by the base station.

If it does not reach the layer turning point, compact DCI is transmitted by configuring MCS and HARQ related fields corresponding to one CW in the DCI since the UE can use only one CW. On the contrary, if it reaches the layer turning point, DCI is transmitted by configuring MCS and HARQ related fields corresponding to two CWs in the DCI since the UE can use two CWs. The UE receives from the base station information on the payload size of DCI and information indicating whether the MCS and HARQ related fields corresponding to one CW or the MCS and HARQ related fields corresponding to two CWs are configured. Then, the UE performs blind detection (BD) for the DCI based on the payload size.

As described above, when a UE determines the size of a field in DCI by comparing the minimum one of the number of CSI-RS ports (the number of SRS ports in the case of UL) and a UE's MIMO capability, the following problem may occur if carrier aggregation (CA) is applied.

In a CA environment, a UE reports its MIMO capability (i.e., the maximum number of layers that can be received in DL (or transmitted in UL)) per bandwidth per band per band combination. If a band combination is composed of the same bands, multiple MIMO capabilities may be reported for the same bands. In this case, the maximum value among the multiple MIMO capabilities is used in determining the minimum one of the number of CSI-RS ports (the number of SRS ports in the case of UL) and the UE's MIMO capability. That is, the UE determines the DCI size by comparing the minimum number of CSI-RS antenna ports and the maximum value among the MIMO capabilities for the same bands consisting of the band combination with the layer turning point.

When multiple CSI-RS resources are configured, each CSI-RS resource may have a different port number (multiple SRS resources may be configured in the case of UL, and in this case, the present disclosure may be applied with respect to the SRS rather than the CSI-RS). In this case, the present disclosure is applied with respect to the maximum port number among the CSI-RS resources. Specifically, the minimum one of the number of CSI-RS ports and the MIMO capability is calculated by assuming that the maximum value among multiple MIMO capabilities is the MIMO capability and the maximum port number among the CSI-RS resources is the number of CSI-RS ports. If this value is equal to or greater than the layer turning point, a DCI field for two CWs is configured. Otherwise, a DCI field for one CW is configured.

In the TDD system where reciprocity is established between UL and DL, a UE reports an RI and a CQI with no PMI. In this case, the present disclosure can be applied with respect to the maximum RI value that can be reported through a reporting setting, which is an independent CSI reporting process.

In addition, a UE may determine the number of MCS fields included in DCI based on its MIMO capability and the number of CSI-RS ports without additional signaling. In particular, the minimum MIMO capability and the number of CSI-RS ports is less than 5, the UE assumes that there is a single MCS field in the DCI. In the next-generation communication system, since a CSI-RS is used for other purposes such as beam management and the like except CSI measurement, the number of CSI ports should be calculated only from CSI-RSs for the CSI measurement. In addition, when multiple CSI-RSs are configured, the number of MCS fields need to be determined with respect to the maximum port number. It is used to assist the UE to determine whether a DCI field (e.g., RV, NDI, MCS, etc.) for one CW or a DCI field for two CWs is defined in DCI as well as the number of MCS fields. Further, it is used by the UE to determine whether the UE needs to report CSI for one CW or CSI for two CWs (i.e., CSI payload size).

Using use codebook subset restriction (CBSR) signaling, a base station may inform a UE whether a DCI field (e.g., RV, NDI, MCS, etc.) for one CW or a DCI field for two CWs is defined in DCI. Herein, a CBSR means that the rank and index of a PMI that a UE can report among all PMIs is limited by a subset. In the new RAT (NR) system, a CBSR may be configured for each reporting setting, and as a result, multiple CBSRs may be configured for a UE at once. For example, CBSR 1 is limited to ranks 1 to 4 and CBSR 2 is limited to ranks 1 to 2. In this case, whether a DCI field (e.g., RV, NDI, MCS, etc.) for one CW or a DCI field for two CWs is configured may be informed with respect to the maximum value among rank values of the CBSRs configured for the UE. Assuming that the maximum rank is 4 and only a single CW is supported in rank 4 or less, the DCI field (e.g., RV, NDI, MCS, etc.) for one CW is defined in the DCI. The reporting setting may be mainly classified into a reporting setting for beam management and a reporting setting for CSI acquisition, and the proposal is applied to CBSRs configured for the reporting setting for CSI acquisition. This is because the reporting setting for beam management does not relate to MCS and rank configurations.

In addition, when multiple reporting settings are configured for a UE, if a reporting setting is used for CSI reporting before N slots from the time of receiving DCI (for example, before one slot in the case of N=1), the proposal is applied only to CBSRs in the reporting setting. Specifically, assuming that reporting settings 1 and 2 are present, if only reporting setting 1 is used for CSI reporting before N slots from the time of receiving the DCI, the proposal is applied to CBSRs corresponding to reporting setting 1.

Third Embodiment

As described above in the second embodiment, the maximum number of layers (z) is limited depending on a UE's MIMO capability and the number of transmission/reception antennas. In this case, different CW-to-layer mapping and a different number of CWs may be designed depending on whether z is equal to or greater than y.

For example, in the case of z<y, one CW is transmitted at all times. Otherwise, one or two CWs may be supported depending on the layer turning point, x. Thus, in the case of a low complexity UE/base station with a small number of transmission/reception layers, only one CW may be supported, that is, there is no additional complexity due to an increase in the number of CWs, thereby simplifying the UE design. In addition, as the DCI payload decreases, control channel overhead may be minimized.

Meanwhile, in the case of a high complexity UE/base station having the maximum number of transmission/reception layers equal to or greater than y, one or two CWs may be used depending on the transmission layer and the layer turning point x. As a result, although the DCI payload increases, precise link adaptation may be achieved, and thus additional gain may be expected.

The third embodiment may be implemented as follows.
When the maximum rank is less than 5, only one CW is supported for one-layer transmission to four-layer transmission.
When the maximum rank is equal to or more than 5 and the layer turning point x is 3, one CW is supported for one-layer transmission and two-layer transmission, and two CWs are supported for three-layer transmission to 8-layer transmission.

Fourth Embodiment

In the current LTE system, TB 1 or TB 2 may be selectively mapped and transmitted as shown in Table 1 below when one CW is transmitted.

TABLE 1

| Transport block 1 | Transport block 2 | Codeword 0 (enable) | Codeword 1 (disable) |
|---|---|---|---|
| enable | disable | Transport block 1 | — |
| disable | enable | Transport block 2 | — |

In the NR system, which is the next-generation communication system, it may be considered that TB 1 or TB 2 is freely mapped when one CW is transmitted. However, in this case, the following issues should be considered.

Although one CW is used for initial transmission, two CWs may be used for retransmission if the rank becomes equal to or greater than the layer turning point x. In this case, there may be a significant layer difference between the initial transmission and the retransmission. The layer difference should be minimized as described above, and to this end, various TB mapping needs to be supported for the two CWs. For example, it is assumed that TB 1 is transmitted during initial rank-4 transmission where one CW is used, and then rank-5 retransmission where two CWs are used is performed due to a NACK. In this case, if rank-5 CW-to-layer mapping is configured such that CW 1 is fixed to two layers and CW 2 is fixed to three layers, it is desirable that the retransmission is performed on three layers based on CW 2. To this end, a base station should be able to indicate that in the case of two CWs, TB to CW mapping is swapped.

Meanwhile, when CW 1 and CW 2 are fixed to TB 1 and TB 2, respectively, (i.e., CW1=TB1 and CW2=TB2), the number of retransmission layers is fixed to 2, and thus a difference from the number of initial transmission layers may increase. The fact that the TB-to-CW mapping is swapped may be implicitly or explicitly indicated by defining a field in DCI or using other fields.

Alternatively, for the same purpose, it is proposed to fix a TB transmitted in CW 1 during initial transmission when a single CW is used, instead of introducing the TB-to-CW mapping.

1) When a single CW is transmitted during the initial transmission, CW 1 is fixed to TB 2 and then transmitted.

2) When CW-to-layer mapping is designed for the layer turning point x where two-CW transmission is allowed, the number of layers mapped to CW 2 is designed to be equal to or more than the number of layers mapped to CW 1. In addition, TB 1 and TB 2 are fixed to CW 1 and CW 2, respectively.

According to this method, when two CWs are used for retransmission with rank 5 although one CW is used for initial transmission with rank 4, retransmitted data corresponds to rank 3 transmission rather than rank 2 transmission.

Since the above operation is valid when two CWs are used for retransmission and one CW is used for initial transmission, it is desirable to apply the operation under not only the operation condition described in section 1) but the condition where a single CW is transmitted through (x−1) layers.

Fifth Embodiment

Meanwhile, when retransmission occurs in a system where the layer turning point between one and two CWs (i.e., the number x of layers for which two CWs start to be used) is not equal to 2 during initial transmission, that is, when two CWs are used for initial transmission and one CW is used for retransmission, the following problems may occurs.

Problem 1. Retransmission Latency

Although a base station uses two CWs for initial transmission, the base station may use one CW for retransmission if the rank of a channel is changed, that is, if the RI value in CSI feedback is changed. In this case, if NACKs occur for all two CWs in the initial transmission, retransmission latency may increase. That is, even though NACKs occur for all two CWs, the two CWs cannot be transmitted at the same time since only one-CW transmission is allowed. That is, since each of them should be alternately retransmitted, the retransmission latency may increase.

To solve this problem, it is proposed that only when two CWs are used for initial transmission and NACKs occurs for all of the two CWs, two-CW transmission is allowed even in layers less than the layer turning point. For example, assuming that the layer turning point x is, for example, 5 (i.e., x=5), if [NACK, NACK] occurs in initial two-CW transmission performed on x layers or more and the rank is changed to be smaller than x, two-CW retransmission is performed instead of one-CW retransmission. In general, considering that the rank is not rapidly changed, the two-CW retransmission may be allowed when the rank decreases to (x−1) rather than when the rank is less than x in order to reduce system complexity.

Since a UE does not know whether retransmission or initial transmission is performed at a rank below the layer turning point, the UE should provide CSI feedback by assuming both cases. In addition to CSI, the UE also needs to provide information indicating whether the corresponding CSI is obtained by assuming the retransmission or initial transmission. Alternatively, the base station may instruct the UE to calculate the CSI by assuming either the retransmission or initial transmission. For example, the base station may instruct the UE to transmit CSI corresponding to one CW with rank 4 and CSI corresponding to two CWs with rank 4. In this case, the CSI corresponding to the two CWs with rank 4 indicates CSI where the retransmission is assumed.

Problem 2. Inefficiency caused by a change in the number of retransmission layers Problem 2 needs to be considered for two cases where the number of layers for retransmission decreases below the layer turning point x and where the number of layers for retransmission increases to the layer turning point x or above.

First, the case where the number of layers for retransmission decreases below the layer turning point x will be described.

Assuming that the layer turning point x is, for example, 5 (i.e., x=5), if a NACK occurs for any one CW in initial two-CW transmission performed on x layers or more and the rank is changed before retransmission such that the number of layers is less than x, the number of initial transmission layers for the CW where the NACK occurs may be different from the number of retransmission layers for the CW. For example, it is assumed that two CWs are transmitted through two layers and three layers during initial transmission with rank 5 and an NACK occurs for the CW transmitted through the three layers. In this case, if the rank is reduced to 4, the number of layers may be changed since the data initially transmitted through the three layers is transmitted through four layers. If the amount of information on redundancy in channel coding increase more than necessary as the number of layers varies, resource efficiency may be degraded.

Therefore, CW-to-layer mapping needs to be designed such that the number of layers for retransmission is allowed to be equal to that for initial transmission. Table 2 below shows an example of such mapping.

TABLE 2

|  | 4 layers (default) | 4 layers Re-Tx afer 5 layers initial Tx | 4 layers Re-Tx afer 5 layers initial Tx |
| --- | --- | --- | --- |
| CW1 | 4 | 2 | 3 |
| CW2 | 0 | 2 | 1 |

It may be generalized as follows. When the numbers of layers for two CWs are a and b at the layer turning point x (where a+b=x), a-layer transmission or b-layer transmission may be allowed for one of the two CWs in the case of retransmission through (x−1) layers. For example, when a=2 and a=3, 4-layer retransmission may be allowed for the two CWs, and in this case, the numbers of layers of the individual CWs may be set to (2, 2) or (3, 1) as shown in Table 2 above.

Next, the case where the number of layers for retransmission increases to the layer turning point x or more will be described. Specifically, when initial one-CW transmission is performed on layers less than the layer turning points x (for example, x=5) and a NACK occurs therefor, if the channel rank is changed, retransmission may be performed on x layers or more.

For example, it is assumed that one CW is transmitted during initial transmission with rank 4 and a NACK occurs for the transmitted CW. In this case, if the rank increases to 5, the number of layers may be changed since the data initially transmitted through the four layers is retransmitted through two or three layers. Thus, in the case of rank-5 retransmission, two CWs may be transmitted through one layer and four layers. When the layer turning point is 4, two CWs may be transmitted through one layer and three layers in the case of rank-4 retransmission. Table 3 below shows an example of such mapping.

TABLE 3

|  | 5 layers (default) | 5 layers Re-Tx afer 5 layers initial Tx |
| --- | --- | --- |
| CW1 | 2 | 1 |
| CW2 | 3 | 4 |

It may be generalized as follows. When the numbers of layers for two CWs are a and b at the layer turning point x (where a+b=x), if retransmission is performed on x layers, a-layer retransmission and b-layer retransmission (where a=x−1 and b=1) may be allowed. For example, even when x=5, a=2, and a=3 in initial transmission, a-layer transmission and b-layer transmission (where a=x−1 and b=1) should be allowed for retransmission. In particular, this proposal may be applied only when initial transmission is performed on (x−1) layers and then retransmission occurs.

According to the above proposal, even if the same rank is used, the number of CWs may be changed depending on whether the current transmission is initial transmission or retransmission. Alternatively, even if the same rank and the same number of CWs are used, CW-to-layer mapping may be changed depending on whether the current transmission is initial transmission or retransmission. Thus, it is desirable that a UE calculates and report CSI based on each of the assumptions. In addition, the assumption used for CSI calculation may be determined by the UE and reported together with the CSI. Alternatively, the assumption may be indicated by a base station for each piece of CSI.

The above-described fifth embodiment of the present disclosure can be applied to the number of UL CWs and UL CW-to-layer mapping or the number of DL CWs and UL CW-to-layer mapping.

Sixth Embodiment

According to the standardization in the next-generation communication system such as the NR system, a base station may inform a UE whether the number of fields in DCI such as an MCS field, an RV field, or an NDI field is one or two through RRC signaling in advance. In addition, the base station may inform the UE of the maximum number of CQIs included in one CSI report made by the UE through RRC signaling in advance. However, since the CQI is reported for each CW, one CQI is reported in the case of one CW, and two CQIs are reported in the case of two CWs.

When the rank indicated by the DCI is 5 or higher even though the number of MCS, RV, and/or NDI field in the DCI is set to 1, there may be an ambiguity in UE operation. This is because two CWs are used in the case of rank 5 or higher and one CW is used in the case of rank 4 or lower. In DL transmission, the rank may be indicated by the number of DM-RS ports for data transmission, and in UL transmission, it may be indicated by the number of DM-RS ports or the number of TRIs or SRS resource indicators (SRI). To solve the ambiguity, it may be defined that the UE does not expect that the number of DM-RS ports (in the case of UL, the rank expressed by the number of TRIs or SRIs) is equal to or more than 5 when the number of MCS, RV, and/or NDI field is set to 1. According to NR Rel-15, a base station may indicate to a UE one or multiple SRIs for non-codebook based transmission, and the number of indicated SRIs may correspond to the rank.

Alternatively, when the number of MCS, RV, and/or NDI field is set to 1, if the number of DM-RS ports (in the case of UL, the rank expressed by the number of TRIs or SRIs) is 5 or higher, it may be considered that one value indicated by each of the MCS, RV, and NDI fields is commonly applied to CW 1 and CW 2. When two tables are used to define DM-RS parameters in the NR for both cases where a single CW or multiple CWs are used as in the DM-RS of the legacy LTE system, if the number of MCS, RV, and/or NDI field is set to 1, the UE may interpret a DM-RS field indicated by the base station by finding it in a DM-RS table for a single CW. If the number of MCS, RV, and/or NDI field is set to 2, the UE may interpret the DM-RS field based on the number of CWs additionally indicated by the base station.

If the reportable rank is set to 5 or higher by a codebook subset restriction (CSR) even though the maximum number of CQIs is set to 1, there may be an ambiguity in the UE operation since two CQIs are transmitted in the case of rank 5 or higher. Thus, when the maximum number of CQIs is set to 1, the UE expects that the reportable rank is set to be less than 5 by the CSR. On the contrary, when the reportable rank is set to be equal to or higher than 5 by the CSR, the UE does not expect that the maximum number of CQIs is set to 1. Alternatively, the UE may report a CQI according to the CSR by ignoring the maximum number of CQIs. Further, the UE may report a CQI based on the maximum number of CQIs by ignoring the CSR for rank 5 or higher (however, the CSR for rank 4 or lower is still valid).

Further, when the maximum number of CQIs is set to 2 even though the number of MCS, RV, and/or NDI field in DCI is set to 1, there may be an ambiguity in the UE operation. Thus, when the number of MCS, RV, and/or NDI field in DCI is set to 1, the UE does not expect that the maximum number of CQIs is set to 2. In addition, when the number of MCS, RV, and/or NDI field in DCI is set to 2, the UE does not expect that the maximum number of CQIs is set to 1.

Figure 9:
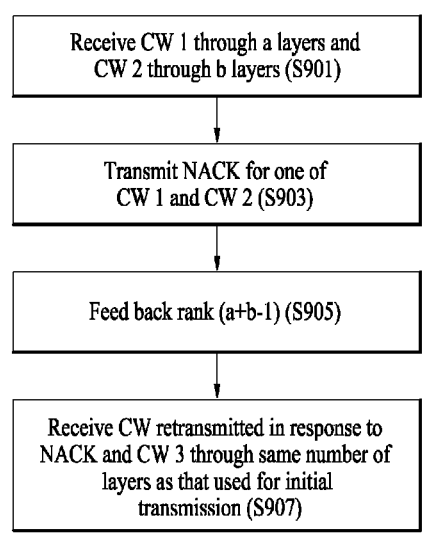
FIG. 9 is a flowchart illustrating a method of receiving a DL signal including at least one codeword according to an embodiment of the present disclosure

FIG. 9 is a flowchart illustrating a method of receiving a DL signal including at least one CW according to an embodiment of the present disclosure.

Referring to FIG. 9, a UE receives CW 1 and CW 2 as initial transmissions in step 901. In particular, the number of layers used by the UE to receive CW 1 and CW 2 corresponds to a minimum rank value for multi-CW transmission. More specifically, CW 1 and CW 2 may be received through a layers and b layers, respectively. In this case, the value of (a+b) is equal to the minim rank value for multi-CW transmission. That is, it may correspond to the above-described layer turning point.

Next, the UE transmits a NACK for one of the first and second CWs (CW 1 and CW 2) to a base station in step 903. Preferably, the present disclosure assumes that the rank decreases after step 901.

In this case, it is desirable that the UE feeds back the reduced rank in step S905. Thereafter, the UE receives the CW retransmitted in response to the NACK and a third CW, which is initially transmitted, in step S907. According to the present disclosure, the retransmitted CW and the initially transmitted third CW are received through a specific number of layers, i.e., (a+b−1) layers, where the specific number is smaller than the minimum rank value for multi-CW transmission. In this case, the number of layers for receiving the retransmitted CW is the same as that used for the initial transmission.

More preferably, the minimum rank value for multi-CW transmission may be 5, and the specific number may be 4.

Specifically, first and second number may be 2 and 3, respectively. In this case, if the retransmitted CW is the first CW, the third CW is received through two layers. If the retransmitted CW is the second CW, the third CW is received through one layer.

Meanwhile, the rank information fed back to the base station may include CSI where single-CW transmission is assumed and CSI where multi-CW transmission is assumed.

Figure 10:
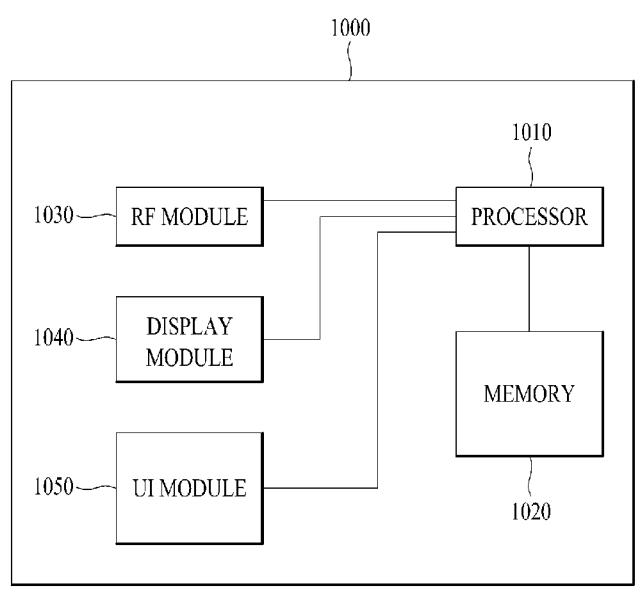
FIG. 10 is a block diagram illustrating a communication device according to an embodiment of the present disclosure.

FIG. 10 is a block diagram illustrating a communication device according to an embodiment of the present disclosure.

Referring to FIG. 10, a communication device 1000 may include a processor 1010, a memory 1020, a Radio Frequency (RF) module 1030, a display module 1040, and a user interface module 1050.

Since the communication device 1000 is illustrated for convenience of description, some of the modules may be omitted. If necessary, other modules may be further included in the communication device 1000. In some cases, some modules may be divided into sub-modules. The processor 1010 may be configured to perform the operations in accordance with the embodiments of the present invention, which are illustrated with the accompanying drawings. The operations of the processor 1010 are described in detail above with reference to FIGS. 1 to 9.

The memory 1020 is connected to the processor 1010 and stores operating systems, applications, program codes, data, etc. The RF module 1030 is connected to the processor 1010 and converts a baseband signal into a radio signal or vice versa. To this end, the RF module 1030 performs analog conversion, amplification, filtering, and frequency up-conversion, or inverse procedures thereof. The display module 1040 is connected to the processor 1610 and displays various information. The display module 1040 may be implemented using well-known elements such as a Liquid Crystal Display (LCD), a Light Emitting Diode (LED), and an Organic Light Emitting Diode (OLED). However, it is not limited thereto. The user interface module 1050 is connected to the processor 1010 and may be implemented by combining well-known user interfaces such as a keypad, a touchscreen, etc.

The above-mentioned embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this disclosure, a specific operation explained as performed by a base station may be performed by an upper node of the base station in some cases. In particular, in a network constructed with a plurality of network nodes including a base station, it is apparent that various operations performed for communication with a terminal can be performed by a base station or other networks other than the base station. 'Base station (BS)' may be substituted with such a terminology as a fixed station, a Node B, an eNode B (eNB), an access point (AP) and the like.

Embodiments of the present invention can be implemented using various means. For instance, embodiments of the present invention can be implemented using hardware, firmware, software and/or any combinations thereof. In case of the implementation by hardware, a method according to each embodiment of the present invention can be implemented by at least one of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known to the public.

It will be apparent to those skilled in the art that various modifications and variations can be made therein without departing from the spirit and scope of the invention. Therefore, the detailed description should not be interpreted restrictively in all aspects but considered as exemplary. Thus, it is intended that the present invention covers the modifications and variations of this invention that come within the scope of the appended claims and their equivalents.

INDUSTRIAL APPLICABILITY

Although the method for mapping between CWs and layers in a next-generation communication system and device therefor are described based on the 3GPP LTE system, the method and device can be applied to various wireless communication systems as well as the 3GPP LTE system.

The invention claimed is:

1. A method of receiving a downlink signal including at least one codeword by a user equipment (UE) in a wireless communication system, the method comprising:
receiving a first codeword through a first number of layers and receiving a second codeword through a second number of layers, wherein the first and second codewords are initially transmitted from a base station;
transmitting, to the base station, a negative acknowledgement for one of the first and second codewords; and
receiving, from the base station, a codeword retransmitted in response to the negative acknowledgement and an initially transmitted third codeword,
wherein a sum of the first and second numbers corresponds to a minimum rank value for multi-codeword transmission,
wherein the retransmitted codeword and the initially transmitted third codeword are received through a specific number of layers, wherein the specific number is less than the minimum rank value for the multi-codeword transmission, and
wherein the number of layers through which the retransmitted codeword is received is equal to that used for initial transmission.

2. The method of claim 1, wherein the minimum rank value for the multi-codeword transmission is 5, and wherein the specific number is 4.

3. The method of claim 2, wherein the first and second numbers are 2 and 3, respectively,
wherein when the retransmitted codeword is the first codeword, the third codeword is received through two layers, and
wherein when the retransmitted codeword is the second codeword, the third codeword is received through one layer.

4. The method of claim 3, wherein the rank information corresponding to the specific number includes channel state information obtained by assuming single-codeword transmission and channel state information obtained by assuming the multi-codeword transmission.

5. The method of claim 1, further comprising feeding back to the base station rank information corresponding to the specific number.

6. A user equipment (UE) for receiving a downlink signal including at least one codeword in a wireless communication system, the UE comprising:
a wireless communication module; and
a processor connected to the wireless communication module,
wherein the processor is configured to:
receive a first codeword through a first number of layers and receive a second codeword through a second number of layers, wherein the first and second codewords are initially transmitted from a base station;
transmit, to the base station, a negative acknowledgement for one of the first and second codewords; and
receive, from the base station, a codeword retransmitted in response to the negative acknowledgement and an initially transmitted third codeword,
wherein a sum of the first and second numbers corresponds to a minimum rank value for multi-codeword transmission,
wherein the retransmitted codeword and the initially transmitted third codeword are received through a specific number of layers, wherein the specific number is less than the minimum rank value for the multi-codeword transmission, and
wherein the number of layers through which the retransmitted codeword is received is equal to that used for initial transmission.

7. The UE of claim 6, wherein the minimum rank value for the multi-codeword transmission is 5, and wherein the specific number is 4.

8. The UE of claim 7, wherein the first and second numbers are 2 and 3, respectively,
wherein when the retransmitted codeword is the first codeword, the third codeword is received through two layers, and
wherein when the retransmitted codeword is the second codeword, the third codeword is received through one layer.

9. The UE of claim 6, wherein the processor is configured to feed back to the base station rank information corresponding to the specific number.

10. The UE of claim 9, wherein the rank information corresponding to the specific number includes channel state information obtained by assuming single-codeword transmission and channel state information obtained by assuming the multi-codeword transmission.

11. The UE of claim 6, wherein the UE is capable of communicating with at least one of another UE, a UE related to an autonomous driving vehicle, the base station or a network.

* * * * *